(12) United States Patent
Kolor et al.

(10) Patent No.: US 12,277,074 B1
(45) Date of Patent: Apr. 15, 2025

(54) MECHANISMS TO UTILIZE COMMUNICATION FABRIC VIA MULTI-PORT ARCHITECTURE

(71) Applicant: Apple Inc., Cupertino, CA (US)

(72) Inventors: Sergio Kolor, Haifa (IL); Sandeep Gupta, Santa Clara, CA (US); James Vash, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 18/473,614

(22) Filed: Sep. 25, 2023

(51) Int. Cl.
*G06F 13/14* (2006.01)
*G06F 13/16* (2006.01)

(52) U.S. Cl.
CPC ...... *G06F 13/1668* (2013.01); *G06F 2213/40* (2013.01)

(58) Field of Classification Search
CPC .......................... G06F 13/1668; G06F 2213/40
See application file for complete search history.

(56) References Cited

U.S. PATENT DOCUMENTS

| | | | | |
|---|---|---|---|---|
| 7,649,795 B2* | 1/2010 | Kim | ..................... | G06F 13/4243 |
| | | | | 365/219 |
| 7,650,480 B2* | 1/2010 | Jiang | ..................... | G06F 3/0662 |
| | | | | 711/113 |
| 8,521,968 B2* | 8/2013 | Hatula | ................. | G06F 13/1663 |
| | | | | 711/149 |
| 11,347,633 B2* | 5/2022 | Park | ..................... | G11C 11/4085 |
| 11,977,780 B2* | 5/2024 | Pathiyakkara Thombra | ............... | |
| | | | | G06F 13/1657 |
| 2003/0097467 A1 | 5/2003 | Sano | | |
| 2014/0086070 A1 | 3/2014 | Saund et al. | | |
| 2014/0137231 A1 | 5/2014 | Sastry et al. | | |
| 2020/0081840 A1 | 3/2020 | Kaushikkar et al. | | |
| 2022/0107836 A1 | 4/2022 | Hammarlund et al. | | |
| 2022/0365896 A1 | 11/2022 | Tolchinsky et al. | | |
| 2023/0152990 A1* | 5/2023 | Kim | ..................... | G06F 3/0688 |
| | | | | 711/105 |

* cited by examiner

*Primary Examiner* — Cheng Yuan Tseng
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed pertaining to utilizing a communication fabric via multiple ports. An agent circuit includes a plurality of command-and-data ports that couple the agent circuit to a communication fabric coupled to a plurality of hardware components that includes a plurality of memory controller circuits that facilitate access to a memory. The agent circuit can execute an instruction that involves issuing a command for data stored at the memory. The agent circuit may perform a hash operation on a memory address associated with the command to determine which one of the plurality of memory controller circuits to which to issue the command. The agent circuit issues the command to the determined memory controller circuit on a particular one of the plurality of command-and-data ports that is designated to the memory controller circuit. The agent circuit may issue all commands destined to that memory controller circuit on that port.

20 Claims, 13 Drawing Sheets

MECHANISMS TO UTILIZE COMMUNICATION FABRIC VIA MULTI-PORT ARCHITECTURE

BACKGROUND

Technical Field

This disclosure relates generally to integrated circuits and, more specifically, to various mechanisms to permit an agent circuit to utilize a communication fabric via multiple ports.

Description of the Related Art

Modern computer systems often include a system on a chip (SOC) that integrates many computer components (e.g., a central processing unit (CPU), a graphics processing unit (GPU), etc.) onto an integrated circuit die. These components are normally coupled to memory devices (e.g., random access memory) of those systems via a memory controller. During operation, the components typically perform read and write operations that involve accessing data from those memory devices. For read and write operations, the components may issue commands for data to the memory controller, which can access the data from a memory device and return it to the components. For read transactions, the components retrieve data without manipulating it, but for write transactions, the components manipulate the data and then ultimately write it back to one of the memory devices. The components further typically implement coherency protocols to ensure that the data is not corrupted or incorrectly viewed as a result of multiple components attempting to interact with that data at the same time.

DETAILED DESCRIPTION

Figure 1:
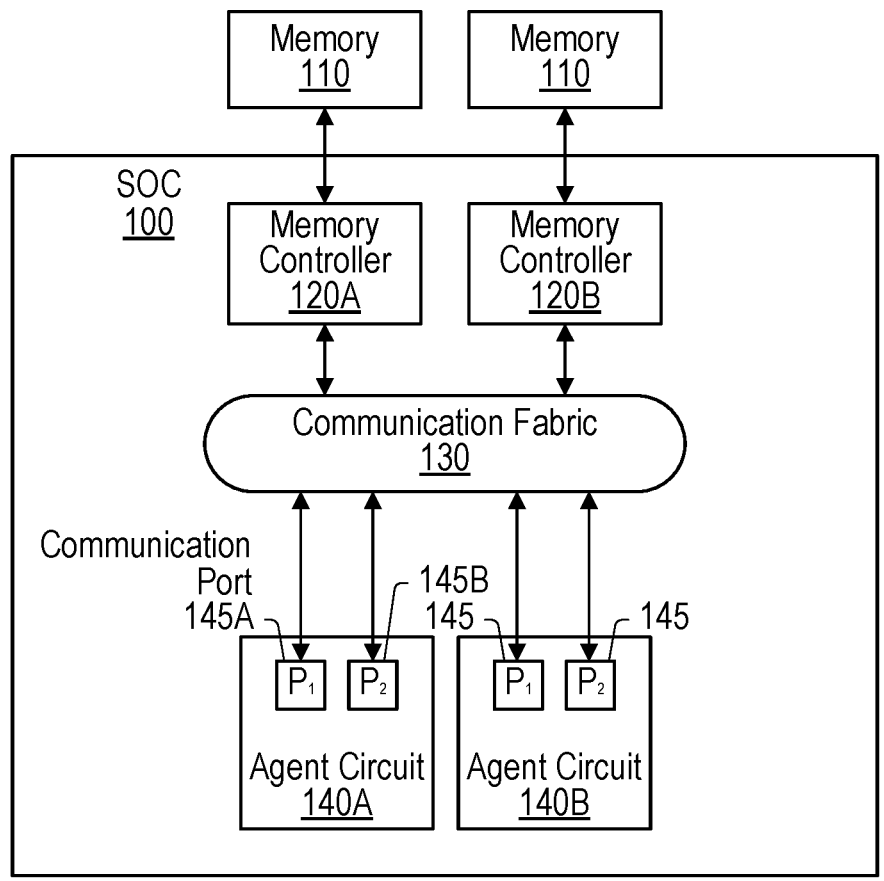
FIG. 1 is a block diagram illustrating example elements of a SOC having an agent circuit that comprises multiple communication ports that couple the agent circuit to a communication fabric of the SOC, according to some embodiments.

An SOC can include various components (e.g., memory controllers, CPU clusters, GPU clusters, input/output (I/O) clusters, etc.) that are coupled together via a communication fabric that can be used to route commands and data between the components. One type of component that is coupled to the communication fabric is an agent circuit. As used herein, the term "agent circuit" refers to circuitry that is configured to issue commands to other components (e.g., other agent circuits, memory controllers, etc.) on the communication fabric. Agent circuits include, but are not limited to, CPU agent circuits having a set of CPU cores, GPU agent circuits having a set of GPU cores, and I/O agent circuits that bridge a set of I/O devices to the communication fabric. In conventional approaches, an agent circuit is coupled to the communication fabric via a single command-and-data (CD) port on which commands and data are sent and received. But using a single CD port has many drawbacks. First, chip designs are increasingly incorporating more and more processor cores into an integrated circuit. As the number of processor cores in a CPU cluster (for example) increases, the number of commands and data sent across the single CD port also increases. The single CD port, in many cases, cannot provide sufficient bandwidth to satisfy the demand of its agent circuit. Second, a communication fabric often provides more bandwidth than a single CD port can consume and thus, due to the limitations of the single CD port, the agent circuit is not able to utilize the full bandwidth of the communication fabric. The present disclosure addresses, among other things, the problem of how to improve the available bandwidth provided to an agent circuit for issuing and receiving commands and data.

In various embodiments that are described below, a system comprises various hardware components that are coupled to a communication fabric that is used route commands and data among those hardware components. Those hardware components may include multiple agent circuits and multiple memory controllers that are coupled to memory. In various embodiments, at least one of those agent circuits includes multiple communication ports that couple that agent circuit to the communication fabric. The multiple communication ports may be CD ports that can be used to issue and receive commands and data to/from the various hardware components coupled to the communication fabric. Those hardware components, in various embodiments, may each be assigned to a communication port such that the agent circuit is configured to issue commands and data to a hardware component on its designated communication port. During its operation, the agent circuit may execute an instruction that involves issuing a command for data that is stored in memory. In various embodiments, the agent circuit determines, based on a memory address associated with the command, which one of the memory controllers to issue the command. In order to make that determination, the agent may perform a hash operation on the memory address to generate a hash value indicative of a particular memory controller. The agent circuit then issues the command on the particular communication port that is designated to that memory controller. The agent circuit can receive a response on the same communication port or a different communication port. In various embodiments, the agent circuit is configured to also issue commands to other hardware components (e.g., other agent circuits) on designated communication ports.

These techniques may be advantageous over prior approaches as these techniques allow for an agent circuit to better utilize the bandwidth of a communication fabric. In particular, by coupling the agent circuit to the communication fabric via multiple CD ports, the agent circuit can issue multiple commands on the communication fabric in the same clock cycle. As a result of the higher available bandwidth, more components (e.g., more processor cores) may be able to be included in the agent circuit—e.g., more processor cores can be included in a CPU cluster. Furthermore, by using hashing operations on certain commands, an agent circuit may balance the commands between multiple communication ports. As an example, the agent circuit may ensure that commands for data from memory are sent to memory controllers in a balanced way such that the communication ports are utilized roughly equally. Also, as discussed below, the use of multiple communication ports allows for the agent circuit to be coupled to the fabric at two or more points. Consequently, the communication fabric can be designed to have multiple communication paths that can be utilized by the agent circuit by coupling the communication ports of the agent circuit to respective communication paths. By increasing the communication paths of the communication fabric, the communication fabric may provide greater bandwidth to hardware components coupled to the fabric.

Turning now to FIG. 1, a block diagram of an example system on a chip (SOC) 100 that is coupled to a memory 110 is depicted. As implied by the name, the components of SOC 100 can be integrated onto a single semiconductor substrate as an integrated circuit "chip." In some cases, however, the components are implemented on two or more discrete chips in a computing system. In the illustrated embodiment, the components of SOC 100 include memory controllers 120A and 120B, a communication fabric 130, and agent circuits 140A and 140B. Components 120 and 140 are all coupled to communication fabric 130 as depicted, and memory controllers 120 can be coupled to memory 110 during use. Also as shown, agent circuits 140 each include two communication ports 145 that couple them to communication fabric 130. SOC 100 can be implemented differently than shown. For example, SOC 100 may include multiple integrated circuit dies that are coupled together, as discussed in greater detail with respect to FIG. 6. It is noted that the number of components of SOC 100 (and the number of subcomponents for those shown in FIG. 1, such as communication ports 145 within agent circuits 140) may vary between embodiments. Accordingly, there may be more or fewer of each component or subcomponent than the number shown in FIG. 1.

For the ease of discussion, various embodiments in this disclosure are described as being implemented using one or more SoCs. But it is to be understood any disclosed SoC can also be implemented using a chiplet-based architecture. Accordingly, wherever the term "SoC" appears in this disclosure, those references are intended to suggest alternate embodiments in which the same functionality is implemented via a less monolithic architecture, such as via multiple chiplets, which may be included in a single package in some embodiments.

On a related note, some embodiments are described herein that include more than SoC. Such architectures are to be understood to encompass both homogeneous designs (in which each SoC includes identical or almost identical functionality) and heterogeneous designs (in which the functionality of each SoC diverges more considerably). Such disclosure also contemplates other embodiments in which the functionality of the multiple SoCs are implemented using different levels of discreteness. For example, the functionality of a first system could be implemented on a single IC, while the functionality of a second system (which could be the same or different than the first system) could be implemented using a number of co-packaged chiplets.

Memory 110 in various embodiments, is usable to store data and program instructions that are executable by components of SOC 100 (e.g., a CPU agent circuit 140) to cause a system having SOC 100 and memory 110 to implement operations described herein. Memory 110 can be implemented using different physical memory media, such as hard disk storage, floppy disk storage, removable disk storage, flash memory, random access memory (RAM-SRAM, EDO RAM, SDRAM, etc.), read only memory (PROM, EEPROM, etc.), etc. Memory available to SOC 100 is not limited to primary storage, such as memory 110. Rather, SOC 100 may further include other forms of storage such as cache memory (e.g., L1 cache, L2 cache, etc.) within an agent circuit 140.

Memory controllers 120, in various embodiments, include circuitry that is configured to receive, from the other components of SOC 100, memory requests (e.g., load/store requests, instruction fetch requests, etc.) to perform memory operations, such as accessing and returning data from memory 110. Memory controllers 120 may be further configured to access any type of memory 110. In various embodiments, memory controllers 120 include queues for storing and ordering memory operations that are to be sent to memory 110. Memory controllers 120 may further include data buffers to store write data awaiting to be written to memory 110 and read data awaiting to be returned to the source of a memory operation, such as an agent circuit 140. While memory controllers 120A and 120B are shown coupled to different memory 110, in various embodiments, they are coupled to the same memory 110.

In various embodiments, memory controllers 120 includes components for maintaining cache coherency within SOC 100, including components that track the location of data of cache lines within SOC 100. Accordingly, in various embodiments, requests for cache line data (e.g., by an agent circuit 140) can be routed through memory controllers 120, which access the data from other agent circuits 140 and/or memory 110. An example of an agent circuit 140 issuing a memory command to memory controller 120 is discussed in more detail with respect to FIG. 4. In addition to accessing data, memory controllers 120 may cause snoop requests to be issued to agent circuits 140 that store the data within their local cache. As a result, memory controller 120 can cause those agent circuits 140 to invalidate and/or evict the data from their local caches to ensure coherency in the system. An example of a snoop request is discussed in more detail with respect to FIG. 5. In some embodiments, memory controllers 120 process exclusive cache line ownership requests in which a memory controller 120 grants an agent circuit 140 exclusive ownership of a cache line while using snoop requests to ensure that the data is not cached in other agent circuits 140.

Communication fabric 130, in various embodiments, is an interconnect that facilitates communication among the components of SOC 100. For example, communication fabric 130 can enable agent circuit 140A to send a memory command to memory controller 120A for data stored at memory 110. Communication fabric 130 may implement any type of communication interconnect and protocol for communicating among components coupled to fabric 130. For example, in some embodiments, communication fabric 180 is bus-based, including shared bus configurations, cross bar configurations, and hierarchical buses with bridges. Communication fabric 130 can be packet-based and hierarchical with bridges, cross bar, point-to-point, or other interconnects. In various embodiments, communication fabric 130 implements a ring topology in which its network switches form a ring such that any network switch may reach any other network switch in the ring by transmitting a communication on the ring in the direction of the other network switch. An example of the ring topology is discussed in more detail with respect to FIG. 3A. Communication fabric 130 may implement a double ring topology, an example of which is discussed in detail with respect to FIG. 3B. The term "communication fabric" can be used interchangeably with the term "communication network."

Agent circuits 140, in various embodiments, include circuitry that is configured to issue commands to components (e.g., other agent circuits 140, memory controllers 120, etc.) coupled to communication fabric 130. Agent circuits 140 may include, for example, processing units (e.g., CPUs, GPUs, etc.), fixed function circuitry, and fixed function circuitry having processor assist via an embedded processor or processors. An example agent circuit 140 that implements a processor complex is discussed in more detail with respect to FIG. 2 In various embodiments, agent circuits 140 can be caching agents having a cache for caching data or that can otherwise take control of cache lines and update the data of the cache lines locally. As such, agent circuits 140 may participate in a cache coherency protocol that ensures that updates to data made by one agent circuit 140 are visible to the other agent circuits 140 that subsequently read that data, and that updates made in a particular order by two or more agent circuits 140 (as determined at an ordering point in SOC 100, such as memory controller 120A) are observed in that order by all agent circuits 140.

In order to issue commands on communication fabric 130, in various embodiments, an agent circuit 140 utilizes communication ports 145 that couple it to communication fabric 130. As illustrated for example, agent circuit 140A comprises two communications ports 145A and 145B—an agent circuit 140 may include more communication ports 145. The communication ports 145, in various embodiments, include at least two CD ports on which commands and data are sent and received. As discussed in detail below, communication ports 145 can be assigned to or otherwise correlated with components that are coupled to communication fabric 130 such that an agent circuit 140 issues commands to a particular component (e.g., memory controller 120A) on its assigned communication port 145 (e.g., port 145A). Accordingly, an agent circuit 140 may maintain a table structure that stores mappings between components of SOC 100 and communication ports 145. During operation, a component (e.g., a processor core) of the agent circuit 140 may seek to issue a command to another component outside of the agent circuit 140 and thus the agent circuit 140 can use the table structure to determine on which communication port 145 to issue that command. In many cases, the command is for data and may be issued to any one of multiple memory controllers 120 (e.g., memory controller 120A or 120B). To better utilize its communication ports 145, in various embodiments, an agent circuit 140 implements a hashing algorithm to attempt to balance commands for data between the communication ports 145. The use of a hashing algorithm is discussed in more detail with respect to FIG. 2.

Figure 2:
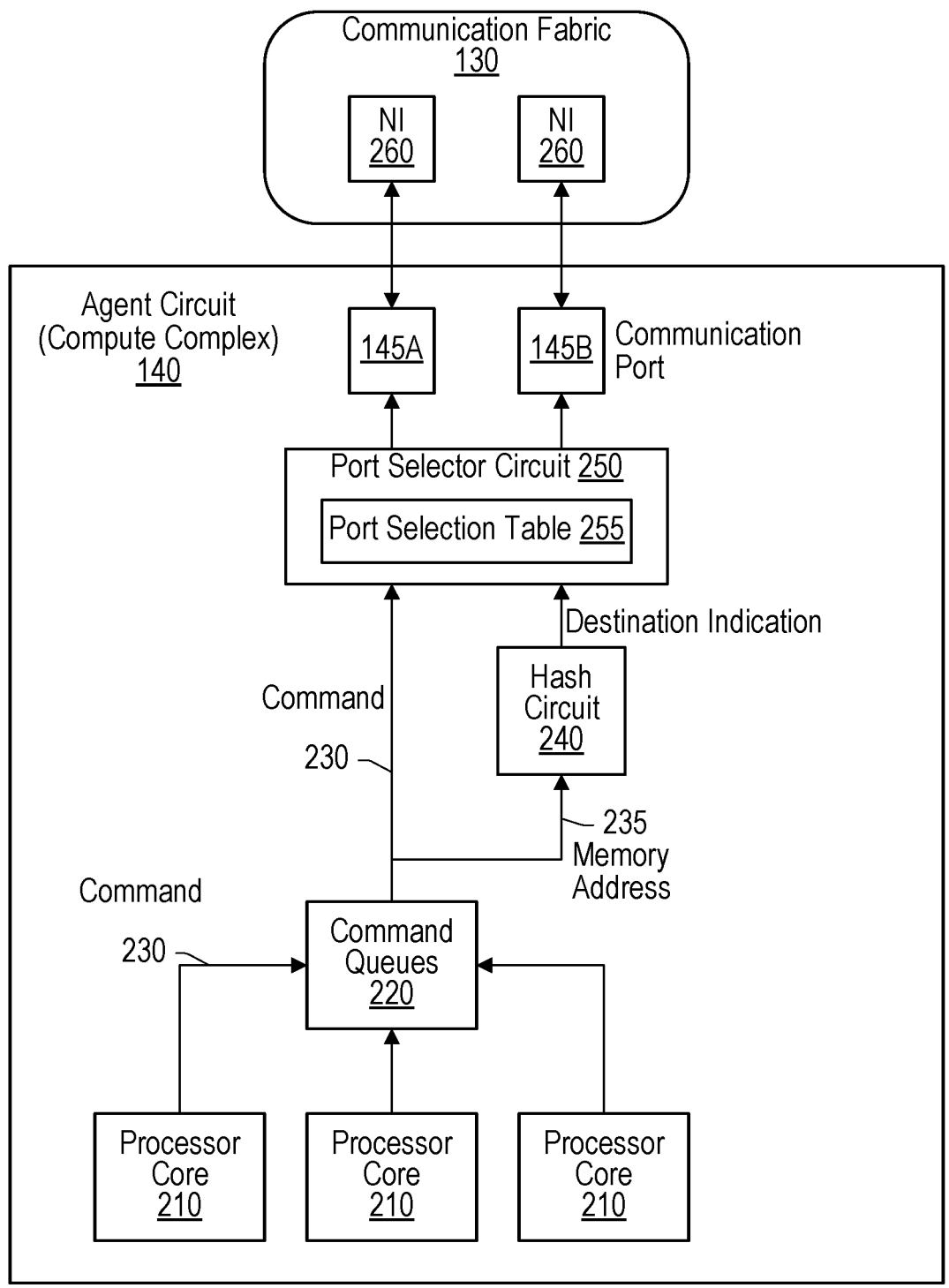
FIG. 2 is a block diagram illustrating example elements of an agent circuit that includes a port selector circuit configured to select a communication port on which to issue a command, according to some embodiments.

Turning now to FIG. 2, a block diagram of an example agent circuit 140 having multiple communication ports 145 is shown. In the illustrated embodiment, agent circuit 140 is coupled to communication fabric 130 via communication ports 145A and 145B included in agent circuit 140 that are coupled to respective network interfaces (NI) 260 of communication fabric 130. As further shown, agent circuit 140 includes processor cores 210, command queues 220, a hash circuit 240, and a port selector circuit 250 that includes a port selection table 255. While agent circuit 140 is depicted as a compute complex (e.g., a CPU) in FIG. 2, agent circuit 140 may be another type of agent, such as an I/O agent circuit that bridges I/O devices (e.g., a monitor) to communication fabric 130.

In various embodiments, a compute complex includes one or more processor cores 210 that can serve as a CPU of SOC 100. Thus, processor cores 210 may execute the main control software of the system, such as an operating system. Generally, software executed by the CPU (during use) controls the other components of the system to realize the desired functionality of the system. Processor cores 210 may execute other software, such as application programs. An application program may provide user functionality and rely on the operating system for lower-level device control, scheduling, memory management, etc. Consequently, processor cores 210 can be referred to as application processors. The compute complex may include other hardware (e.g., L2 cache) or implement a different type of processing unit (e.g., a GPU).

A processor core 210, in various embodiments, includes any circuitry and/or microcode that is configured to execute instructions defined in an instruction set architecture implemented by that processor core 210. Processor cores 210 may fetch instructions and data from memory 110 as a part of executing load instructions and store the fetched instructions and data within caches of agent circuit 140. In various embodiments, processor cores 210 share a common last level cache (e.g., an L2 cache) while including their own cache(s) (e.g., an L0 cache, an L1 cache, etc.) for storing instructions and data. Processor cores 210 may retrieve instructions and data from their caches and execute the instructions (e.g., conditional branch instructions, ALU instructions, etc.) to perform operations involving the retrieved data. Processor cores 210 may then write results of those operations back to memory 110. Processor cores 210 may encompass discrete microprocessors, processors and/or microprocessors integrated into multichip module implementations, processors implemented as multiple integrated circuits, etc.

During its operation, a processor core 210 can execute instructions that involve issuing commands 230 (alternatively referred to as messages) to components outside of its agent circuit 140 to achieve an objective. For example, a processor core 210 may execute a load instruction to load data from memory and thus issue a command 230 in the form of a DRAM request to a memory controller 120 to fetch the data from DRAM. Examples of commands 230 can include, but are not limited to, DRAM requests, snoop responses (in a snoop back approach, discussed in respect to FIG. 5), snoop completions (in a snoop forward approach), Peripheral Component Interconnect Express (PCI-e) memory requests, and acknowledgement responses. Commands 230 may be issued as a part of a transaction (e.g., a DRAM transaction) that involves a request (e.g., a DRAM request) and a response (e.g., a DRAM response). As depicted, commands 230 are sent from processor cores 210 to command queues 220.

A command queue 220, in various embodiments, is circuitry configured to store a set of commands 230 that are to be issued on communication fabric 130. A command queue 220 may comprise one or more buffers or one or more linked list structures that implement an ordering protocol (e.g., a first in, first out protocol) that preserves the ordering of commands 230 within a command queue 220. For example, a PCI-e-based transaction might involve issuing multiple commands 230 (i.e., PCI-e memory requests) to a PCI-e component that have to be completed in a certain order. Accordingly, a command queue 220 may preserve that order using a linked list structure to ensure that the commands 230 are released in a manner that preserves the order. In various embodiments, command queues 220 respectively store different types of commands 230—e.g., one command queue 220 may store DRAM requests while another command queue 220 stores snoop responses. While not shown, command queues 220 may include or be coupled to circuitry that is configured to control the flow of commands 230 from command queues 220 by selecting from which command queue 220 to provide a command 230 to port selector circuit 250.

As depicted in FIG. 2, command queues 220 send commands 230 to port selector circuit 250 for issuance on a communication port 145. For certain types of commands 230, in various embodiments, a memory address 235 of those commands 230 is routed to hash circuit 240. For example, if a command 230 is a DRAM request being issued to a memory controller 120, then the target memory address of that command 230 may be sent to hash circuit 240 to determine which memory controller 120 to use to process that DRAM request. But if a command 230 has a known recipient (e.g., it is being issued to a certain agent circuit 140), then hash circuit 240 may not be used for that command 230—the memory address 235 of that command 230 might still be sent to hash circuit 240, but the resulting output of hash circuit 240 is discarded.

Hash circuit 240, in various embodiments, is circuitry that is configured to perform a hash operation on a memory address 235 of a command 230 (e.g., the address of the data being accessed by a DRAM request) to derive a hash value that is usable to determine which memory controller 120 to issue the command 230. Hash circuit 240 may implement a hashing algorithm that attempts to balance commands 230 between memory controllers 120 of SOC 100 such that each one receives relatively the same number of commands 230 from agent circuit 140. Hash circuit 240 may hash a portion of a memory address 235 (e.g., the lower 16 bits) or its entirety to derive a hash value. In various embodiments, the hash values produced by hash circuit 240 are correlated to the memory controllers 120 of SOC 100 (and potentially other components of SOC 100) such that a hash value is indicative of a memory controller 120. For example, SOC 100 may include four memory controllers 120 and thus hash circuit 240 may derive hash values having one of four different values—the hashing algorithm may produce a value and a module operation may be applied by hash circuit 240 to that value (e.g., hash value modulo 3) to ensure that it falls within a range of values that corresponds to the number of memory controllers 120. Based on the hash value produced from a memory address 235, in various embodiments, hash circuit 240 determines which memory controller 120 to issue the corresponding command 230 and then sends a destination indication to port selector circuit 250 that identifies that memory controller 120. In some embodiments, the hash value can be sent to port selector circuit 250 to determine which memory controller 120 to issue the corresponding command 230.

Port selector circuit 250, in various embodiments, is circuitry that is configured to select a communication port 145 on which to issue a command 230 and then issue that command 230 on the selected communication port 145. To determine which communication port 145 to use, port selector circuit 250 may utilize port selection table 255. Port selection table 255, in various embodiments, is a storage structure (e.g., an array) that is used to store a mapping that specifies, for certain components coupled to communication fabric 130 (e.g., a memory controller 120, an agent circuit 140, etc.), which communication port 145 to use for issuing commands 230 to those components. For example, port selection table 255 may indicate that communication port 145A is mapped to memory controller 120A and therefore commands 230 destined for memory controller 120A (which may be indicated by a destination indication from hash circuit 240) are sent by port selector circuit 250 using communication port 145A. In various embodiments, the mapping is implemented as circuitry instead of being stored as data in port selection table 255, or it may be stored in programmable registers or other storage mechanisms.

In various embodiments, port selector circuit 250 can also utilize port selection rules to determine which communication port 145 to use to send a command 230. Those port selection rules may specify, for a given type of command 230, which communication port 145 to use to issue that type of command 230. For example, the port selection rules may indicate that PCI-e commands 230 (or non-dynamic random-access memory (non-DRAM) commands 230) are to be issued on communication port 145A and, as a result, port selector circuit 250 issues all PCI-e commands 230 on that port. The port selection rules may be used by port selector circuit 250 in cases in which port selector circuit 250 does not receive a destination indication from hash circuit 240. The port selection rules can be implemented as circuitry or stored as data (e.g., in port selection table 255). Port selector circuit 250 may also use a combination of the mapping of port selection table 255 and the port selection rules to determine which communication port 145 to use for issuing a command 230.

In various embodiments, port selector circuit 250 can issue commands 230 on different communication ports 145 within the same clock cycle. As such, in the illustrated embodiment, port selector circuit 250 may issue commands 230 on communication ports 145A-B within the same cycle so that port selector circuit 250 fully utilizes all available communication ports 145 of agent circuit 140. Accordingly, processor cores 210 may collectively utilize communication ports 145A-B. As shown, communication ports 145A-B are coupled to respective NI 260 that are configured to receive commands 230 issued via those communication ports. An NI 260, in various embodiments, is circuitry configured to bridge components (e.g., an agent circuit 140) to communication fabric 130. An NI 260 may include serializer/reserialized (SERDES) circuits that can be used to communicate across the boundary between communication fabric 130 and an agent circuit 140. Accordingly, while not shown, an NI 260 may be included in agent circuit 140 that is coupled to a NI 260 on communication fabric 130. NIs 260 may include sufficient routing storage (e.g., buffers and queues) and logic (e.g., an arbitration circuit) for managing the routing of commands 230.

Figure 3A:
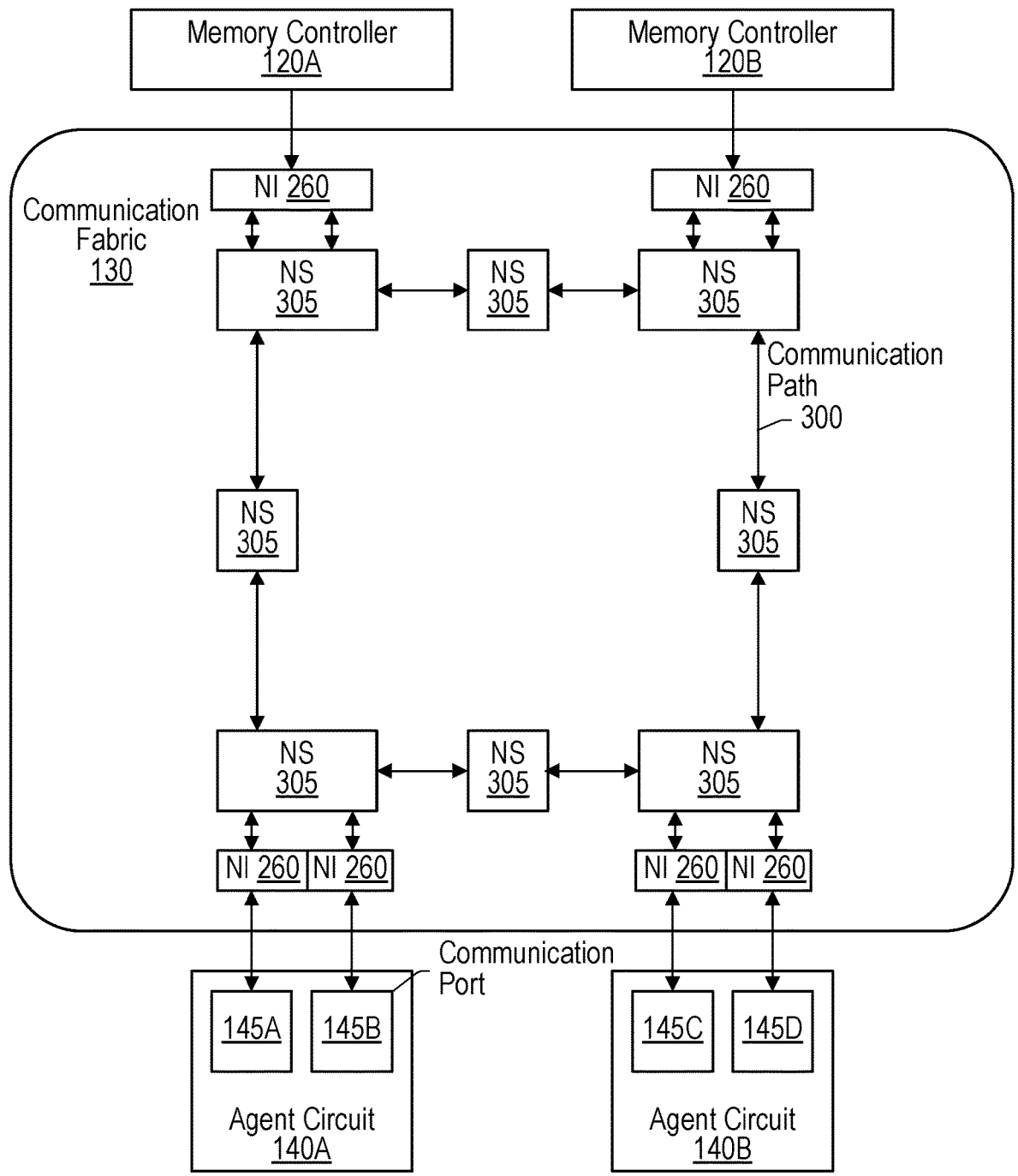
FIGS. 3A-B are block diagrams illustrating different communication fabric topologies, according to some embodiments.

Turning now to FIG. 3A, a block diagram of an example communication fabric 130 that comprises a ring topology is shown. In the illustrated embodiment, communication fabric 130 includes a collection of network switches 305 that are coupled together to form a ring having a communication path 300. As further depicted, memory controllers 120A-B and agent circuits 140A-B are coupled to NIs 260 that bridge those components to the ring that is formed by the network switches 305. As shown, agent circuit 140A is coupled to NIs 260 via communication ports 145A-B, and agent circuit 140B is coupled to NIs 260 via communication ports 145C-D. In some embodiments, communication fabric 130 is implemented differently than shown, such as comprising a double ring topology, as discussed with respect to FIG. 3A.

A network switch 305, in various embodiments, is a circuit that is configured to receive communications on a network and forward the communications on the network in the direction of the destination of the communication. For example, a communication sourced by a processor core 210 can be sent to a memory controller 120 that controls a memory 110 that is mapped to the address of the communication. At each network switch 305 in the path, the communication can be transmitted forward toward the memory controller 120. If the communication is a read, the memory controller 120 may communicate data back to the source, and each network switch 305 forwards that data toward the source. In various embodiments, communication fabric 130 supports virtual channels, which are channels that physically share a network but are logically independent on the network (e.g., communications in one virtual channel do not block progress of communications in another virtual channel). Accordingly, a network switch 305 can employ resources dedicated to each virtual channel (e.g., buffers, queues, or linked lists in a queue) so that communications on the virtual channels remain logically independent. A network switch 305 may also employ arbitration circuitry to select among buffered communications to forward on communication fabric 130.

In various embodiments, in a ring topology, each network switch 305 can be connected to two other network switches 305 to form a ring such that any network switch 305 may reach any other network switch 305 in the ring by transmitting a communication (e.g., a command 230) on the ring in the direction of the other network switch 305. A given communication may pass through one or more intermediate network switches 305 in the ring to reach the targeted network switch 305. When a network switch 305 receives a communication from an adjacent network switch 305 on the ring, the network switch 305 may examine the communication to determine if a component (e.g., a memory controller 120, an agent circuit 140, etc.) to which the network switch 305 is coupled is the destination of that communication. If so, the network switch 305 may forward the communication to the component. If not, the network switch 305 may forward the communication to the next network switch 305 (e.g., the other network switch 305 that is adjacent to the network switch 305 and is not the adjacent network switch 305 from which the network switch 305 received the communication). As used herein, the term "adjacent network switch 305" refers to a network switch 305 to which a given network switch 305 can directly send a communication, without the communication traveling through any intermediate network switches 305.

Accordingly, in various embodiments, when an agent circuit 140 sends a command 230 to a particular component (e.g., memory controller 120B), that command 230 traverses around the ring (via communication path 300 by being transmitted by network switches 305) until it reaches that component or it is transmitted to another network (e.g., to another communication fabric 130, which may be a part of another die). In the illustrated embodiment, communication path 300 is bi-directional and thus a command 230 and a response to the command may traverse the same network switches 305 (e.g., the command moves counterclockwise while the response moves clockwise through a particular set of network switches 305). But in some embodiments, communication path 300 has a single direction. As a result, a command 230 and a response to the command may traverse the entire loop formed by the ring.

Communication fabric 130 may also implement a credit mechanism to prevent an agent circuit 140 from solely saturating communication fabric 130 (i.e., consuming all the bandwidth available for routing commands 230) when there are at least two agent circuits 140 attempting to issue commands 230 on communication fabric 130. In particular, agent circuits 140 may be allocated credits that allow them to issue a particular number of commands 230 within a period of time. When issuing a command 230, an agent circuit 140 may provide a credit or otherwise indicate to communication fabric 130 (e.g., to its NI 260) that the agent circuit 140 has a credit and it is being consumed. If an agent circuit 140 consumes all its credits, then it may wait until it has received additional credits before attempting to issue another command 230. The number of credits allocated to an agent circuit 140 may be less than a total number of credits needed to saturate communication fabric 130. If an agent circuit 140 is not using all of its credits, then it may provide the unused credits to other agent circuits 140. As a result, in various embodiments, if there is only one agent circuit 140 issuing commands 230 within a period of time, then that agent circuit 140 may receive enough credits from the other agent circuits 140 to solely saturate communication fabric 130.

Figure 3B:
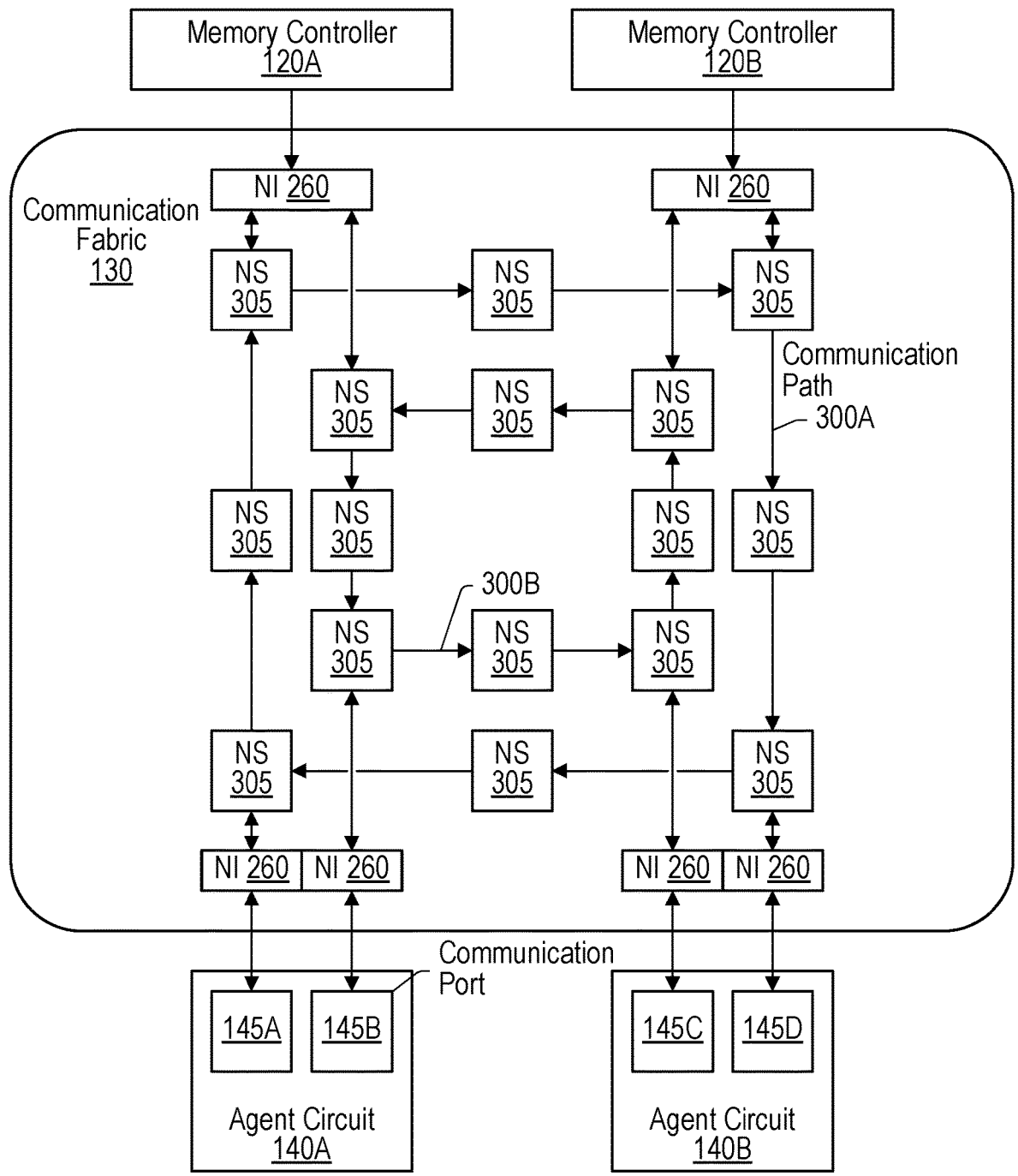

Turning now to FIG. 3B, a block diagram of an example communication fabric 130 that comprises a double ring topology is shown. In the illustrated embodiment, communication fabric 130 includes a first set of network switches 305 that are coupled together to form a first ring (a communication path 300A) and a second set of network switches 305 that are coupled together to form a second ring (a communication path 300B). As depicted, memory controllers 120A-B and agent circuits 140A-B are coupled to NIs 260 that bridge the components to both rings. Also as depicted, agent circuit 140A is coupled to communication path 300A (the first ring) via a communication port 145A and communication path 300B (the second ring) via a communication port 145B. As depicted, agent circuit 140B is also coupled to communication path 300A via a communication port 145C and communication path 300B via a communication port 145D. In some embodiments, there may be more than two communication paths 300.

In the illustrated embodiment, the network switches 305 of communication path 300A are configured to route commands 230 in a clockwise direction among the components coupled to communication fabric 130 while the network switches 305 of communication path 300B are configured to route commands 230 in a counterclockwise direction. In view of this directional nature of communication paths 300A-B, in various embodiments, the mapping between certain components (e.g., memory controllers 120A-B) and the communication ports 130 of an agent circuit 140 is defined such that commands 230 travel the shortest distance from the agent circuit 140 to the recipient. For example, memory controller 120A might reside on the west side of its die, and thus it may involve less network switches 305 to travel counterclockwise to memory controller 120A. As a result, memory controller 120A may be mapped to communication port 145A such that commands 230 issued to memory controller 120A by agent circuit 140A travel communication path 300A. By having multiple communication paths 300, the entire bandwidth of communication fabric 130 may be increased—e.g., it may double when two communication paths 300 instead of one path 300. While communication paths 300A-B are one directional, in some embodiments, they are bi-directional and thus commands can 230 flow in either direction on communication paths 300A-B.

While a clockwise-counterclockwise topology is depicted, other fabric topologies with different routing rules and paths may be implemented for communication fabric 130. In some embodiments, communication fabric 130 is a mesh topology. That mesh topology may be a fully-connected mesh in which there is a connection from each network switch 305 to each other network switch 305 and thus any communication may be transmitted without traversing any intermediate network switches 305. The mesh topology may be a partially-connected mesh in which at least some communications may pass through one or more intermediate network switches 305 in the mesh. The routings may be configured to transport the communications through the fewest number of network switches 305 (the "shortest path") between the source and destination agent that may be supported in the mesh topology. But in some embodiments, communication fabric 130 is a tree topology in which network switches 305 are interconnected to form a tree.

Figure 4:
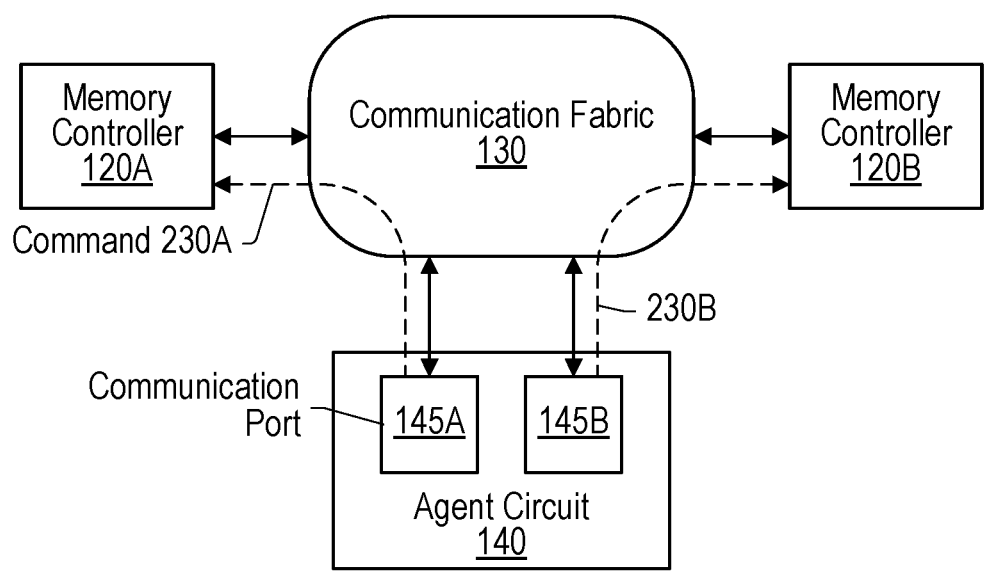
FIG. 4 is a block diagram illustrating an agent circuit utilizing different communication ports to issue commands to different memory controllers, according to some embodiments.

Turning now to FIG. 4, a block diagram of an example of an agent circuit 140 utilizing different communication ports 145 to issue commands to different memory controllers 120 is shown. In the illustrated embodiment, there is agent circuit 140 and memory controllers 120A-B, all of which are coupled to communication fabric 130. As further shown, agent circuit 140 includes two communication ports 145A-B. The illustrated embodiment may be implemented differently than shown—e.g., there may be more memory controllers 120.

As discussed, in various embodiments, components (e.g., memory controllers 120) are mapped to communication ports 145 based on where they are coupled to communication fabric 130. In the illustrated embodiment, communication port 145A is mapped to memory controller 120A instead of communication port 145B being mapped to memory controller 120A because the distance (e.g., the number of network switches) is greater from communication port 145B than communication port 145A. This may be due to communication port 145A being coupled to a clockwise directional ring of communication fabric 130 while communication port 145B is coupled to a counterclockwise directional ring. Accordingly, when issuing a command 230A (e.g., a DRAM request) to memory controller 120A, agent circuit 140 issues that command via communication port 145A. Likewise, in the illustrated embodiment, communication port 145B is mapped to memory controller 120B. As a result, when issuing a command 230B to memory controller 120B, agent circuit 140 issues command 230B via communication port 145B instead of communication port 145A. In various embodiments, multiple memory controllers 120 (and other components such as agent circuits 140) are mapped to the same communication port 145. In some instances, there may be multiple memory controllers 120 residing on the same side of a die that are mapped to the same communication port 145. Further, in various embodiments, agent circuit 140 is configured to issue commands 230A-B in the same clock cycle. By using multiple communication ports 145, agent circuit 140 can issue more commands 230 than using a single communication port 145.

Figure 5:
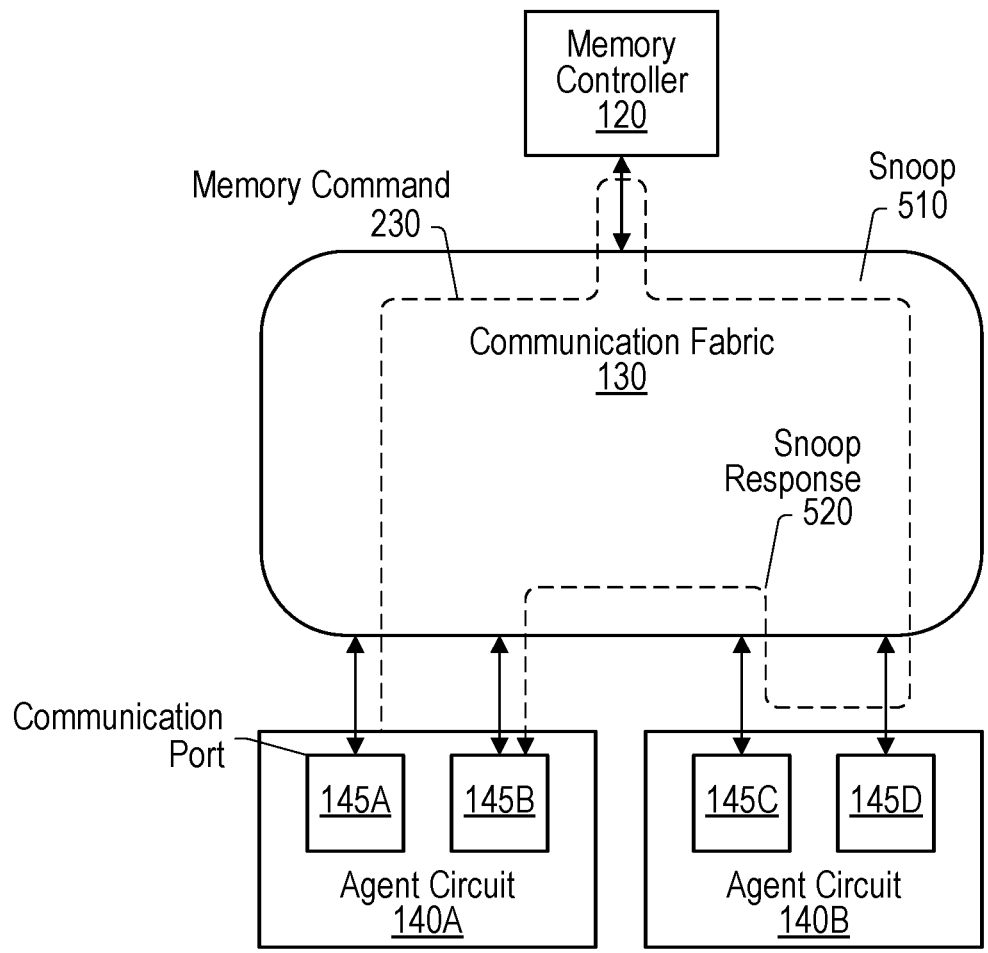
FIG. 5 is a block diagram illustrating an example of an agent circuit receiving a response on a different communication port than the communication port used to issue the corresponding command, according to some embodiments.

Turning now to FIG. 5, a block diagram of an example of an agent circuit 140 receiving a response on a different communication port 145 than a communication port 145 used to issue a particular command 230. In the illustrated embodiment, there is a memory controller 120 and agent circuits 140A-B, all of which are coupled to communication fabric 130. Also as shown, agent circuit 140A includes two communication ports 145A-B, and agent circuit 140B includes two communication ports 145C-D.

In various embodiments, an agent circuit 140 may receive a response on a different port 145 than the port 145 used to issue the command 230 that resulted in the response. One example case pertains to snooping. In various embodiments, at least two types of snoops are supported: snoop forward and snoop back. Snoop forward commands may be used to cause a component (e.g., an agent circuit 140) to forward the data of a cache line to another component, whereas snoop back commands may be used to cause the component to return the data of the cache line to memory controller 120. Supporting snoop forward and snoop back flows may allow for both three-hop (snoop forward) and four-hop (snoop back) behaviors. For example, snoop forward is used to minimize the number of commands when a cache line is provided to a component, since the component may store the cache line and potentially use the data therein. On the other hand, a non-cacheable component may not store the entire cache line, and thus the copy back to memory may ensure that the full cache line data is captured in memory controller 120.

As shown in FIG. 5, agent circuit 140A issues, via communication port 145A, a memory command 230 (e.g., a DRAM request) to memory controller 120 for certain data. In response to receiving memory command 230, memory controller 120 may provide the requested data or observe that a copy of the requested data is stored in a cache outside of memory controller 120. As an example, agent circuit 140B may store the requested data in a local cache. Accordingly, in various embodiments, memory controller 120 issues a snoop 510 to agent circuit 140B that pertains to the requested data. Agent circuit 140B receives snoop 510 from memory controller 120 and processes that snoop 510 to update the cache line state (e.g., invalidate the cache line) of the cache line having the data. Agent circuit 140B may then provide the data of the cache line (if specified by snoop 510) to the initial ownership requestor (e.g., agent circuit 140A) or memory controller 120. A snoop response 520 or a "completion", in various embodiments, is a message that indicates that the state change has been made and provides the copy of the cache line data, if applicable. When the snoop forward mechanism is used, the data is provided to the requesting component in three hops over communication fabric 130: 1) the command from the requesting component to memory controller 120, 2) the snoop from memory controller 120 to the component having the relevant cache, and 3) the snoop response by the caching component to the requesting component. In the illustrated embodiment, agent circuit 140A receives snoop response 520 via communication port 145B.

Figure 6:
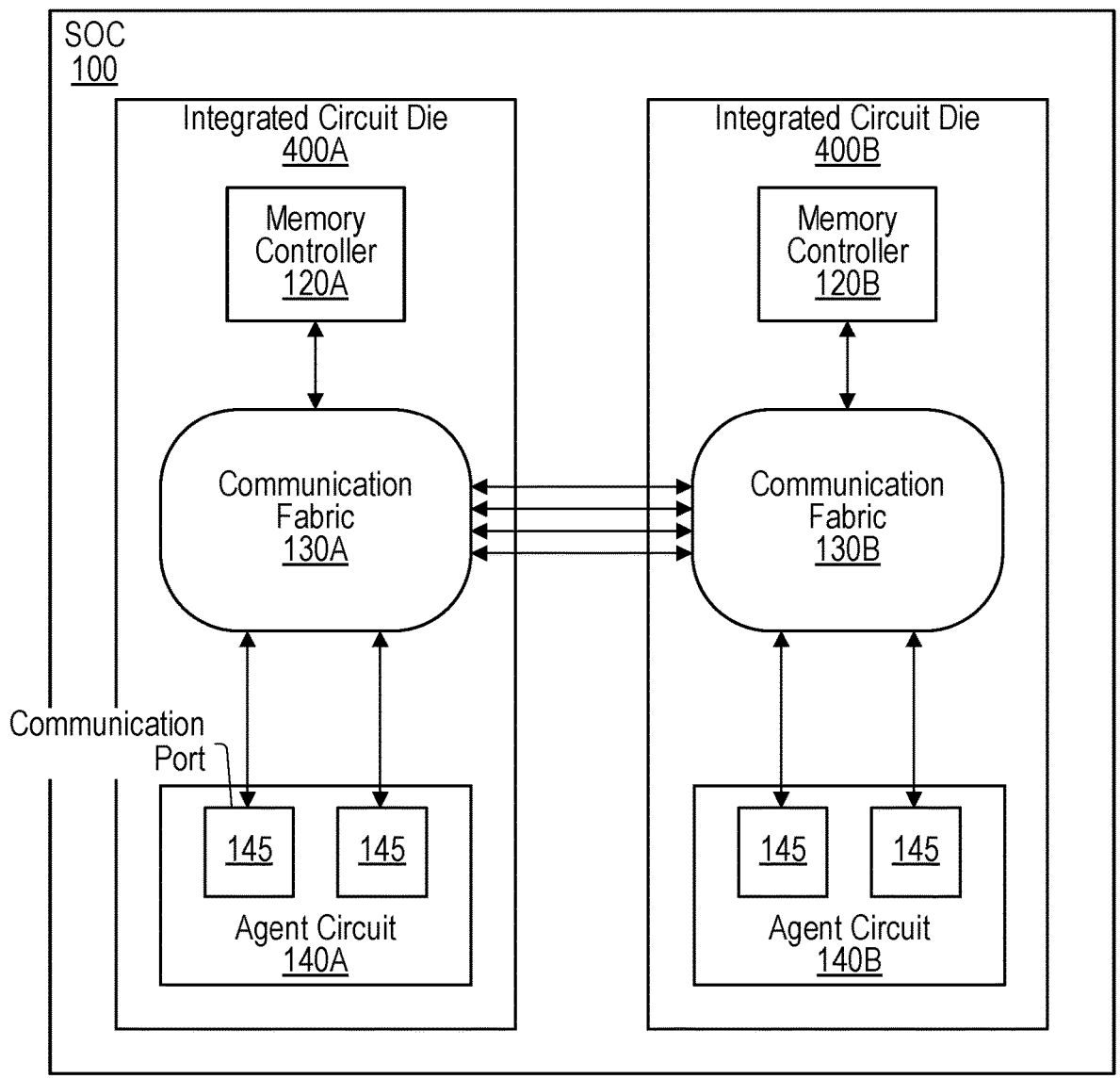
FIG. 6 is a block diagram illustrating an example multi-die topology, according to some embodiments.

Turning now to FIG. 6, an example of a multi-die topology is shown. In the illustrated embodiment, SOC 100 comprises integrated circuit dies 400A-B that are coupled together. As further shown, integrated circuit dies 400A-B respectively include memory controllers 120A-B, communication fabrics 130A-B, and agent circuits 140A-B. Also as shown, agent circuits 140A-B each include multiple communication ports 145. The illustrated embodiment may be implemented differently than shown. As an example, there may be more integrated circuit dies 400 than shown.

Integrated circuit dies 400, in various embodiments, are component packages of SOC 100 that each integrate one or more of types of components (e.g., CPU). In some embodiments, integrated circuit dies 400 have the same set of hardware components (e.g., CPU, GPU, etc.)—i.e., they are copies of each other (excluding any manufacturing defects/differences). Integrated circuit dies 400, however, can include different hardware components. For example, integrated circuit die 400A may include a CPU while integrated circuit die 400B may include a GPU. In various embodiments, integrated circuit dies 400 are configured as a single system in which the existence of multiple dies 400 is transparent to software executing on the single system—that is, SOC 100 may be a multi-die system in which the hardware hides the fact that there are multiple dies from software (e.g., by keeping power states synchronized, ensuring latencies are low etc.).

In various embodiments, integrated circuit dies 400 collectively implement a die-to die (D2D) interface that extends networks and buses of integrated circuit dies 400 among dies 400 such that those networks and buses can function as a single unified fabric topology connecting them together. D2D interface may provide various signals that can be asserted/driven by sender blocks on one die 400 and received by the corresponding receiver blocks on another die 400. For example, agent circuit 140A may issue a command 230 to agent circuit 140B that traverses network switches 305 of communication fabric 130A and 130B to reach agent circuit 140B. In various embodiments, the mapping between components and communication ports 145 (stored by an agent circuit 140) accounts for multi-die topologies. The communication port 145 used to send a command 230 to a component on another die 400 may correspond to the shortest path through both dies 400 to that component.

Figure 7:
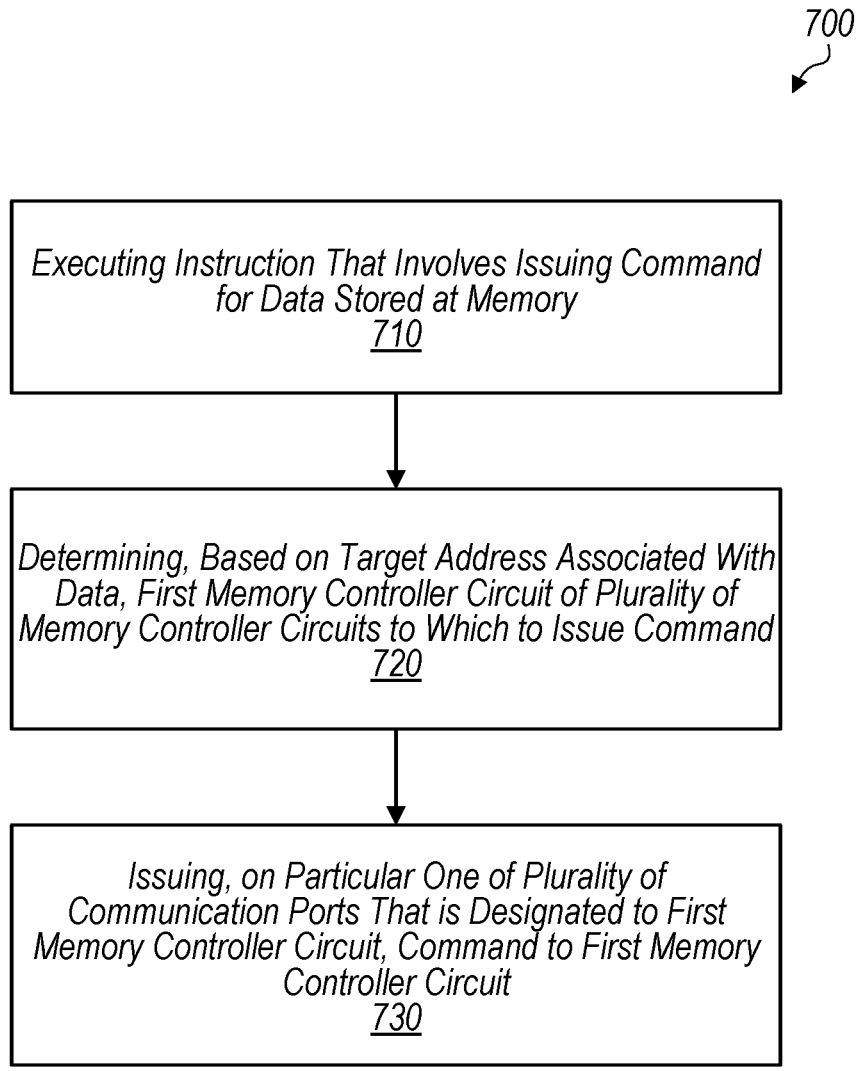
FIGS. 7-9 are flow diagrams illustrating example methods that pertain to an agent circuit issuing a command, according to some embodiments.

Turning now to FIG. 7, a flow diagram of a method 700 is shown. Method 700 is one embodiment of a method performed by an agent circuit (e.g., an agent circuit 140) of a system (e.g., a computing device having SOC 100) as a part of issuing a command (e.g., a command 230). Method 700 may include more or less steps than shown. For example, method 700 may include a step in which the agent circuit receives a response in response to issuing the command to another component.

Method 700 begins in step 710 with the agent circuit executing an instruction (e.g., a load instruction) that involves issuing a command for data stored at a memory (e.g., a memory 110). In various embodiments, the agent circuit comprises a plurality of communication ports (e.g., communication ports 145A and 145B) that couple the agent circuit to a communication fabric (e.g., communication fabric 130). The communication fabric may be coupled to ones of a plurality of hardware components (e.g., memory controllers 120, agent circuit 140, etc.) and configured to route commands among the hardware components coupled to the communication fabric. A given communication port of the plurality of communication ports is usable to issue commands to other components of the plurality of hardware components. At least two of the plurality of communication ports may be command-and-data ports that are configured to issue and receive commands and data.

In step 720, the agent circuit determines, based on a target address (e.g., a memory address 235) associated with the data, a first memory controller circuit (e.g., memory controller 120A) of the plurality of memory controller circuits to which to issue the command. In various embodiments, in order to determine to which memory controller circuit to issue the command, the agent circuit performs a hash operation on the target address to generate a hash value that corresponds to a memory controller circuit.

In step 730, the agent circuit issues, on a particular one of the plurality of communication ports that is designated to the first memory controller circuit, the command to the first memory controller circuit. In various embodiments, the agent circuit is configured to issue different types of commands (e.g., DRAM requests, snoop responses, snoop completions, etc.) on the plurality of communication ports, including a particular type (e.g., LLC-as-RAM requests) for which the agent circuit is configured to issue all commands of that particular type on the same communication port. The agent circuit may also issue commands on at least two different ones of the plurality of communication ports within the same clock cycle. In various embodiments, the agent circuit issues commands to at least two different memory controller circuits on the same communication port.

The agent circuit may issue a command to a second agent circuit (e.g., agent circuit 140B) on a first one of the plurality of communication ports in accordance with a set of mappings (e.g., port selection table 255) that identify, for a given agent circuit, which one of the plurality of communication ports to use to issue commands to the given agent circuit. The agent circuit may receive a response from the second agent circuit on a second one of the plurality of communication ports that is different than the first communication port. In some embodiment, the system includes multiple integrated circuit dies that are coupled together—the first and second agent circuits can reside on different ones of the integrated circuit dies.

In some embodiments, the communication fabric prevents the agent circuit from solely saturating the communication fabric when there are at least two agent circuits attempting to issue commands on the communication fabric. The communication fabric may also comprise a first communication path (e.g., communication path 300A) that is coupled to a first one of the plurality of communication ports and is configured to route commands in a clockwise direction among the plurality of hardware components, and a second communication path (e.g., communication path 300B) that is coupled to a second one of the plurality of communication ports and is configured to route commands in a counterclockwise direction among the plurality of hardware components.

Figure 8:
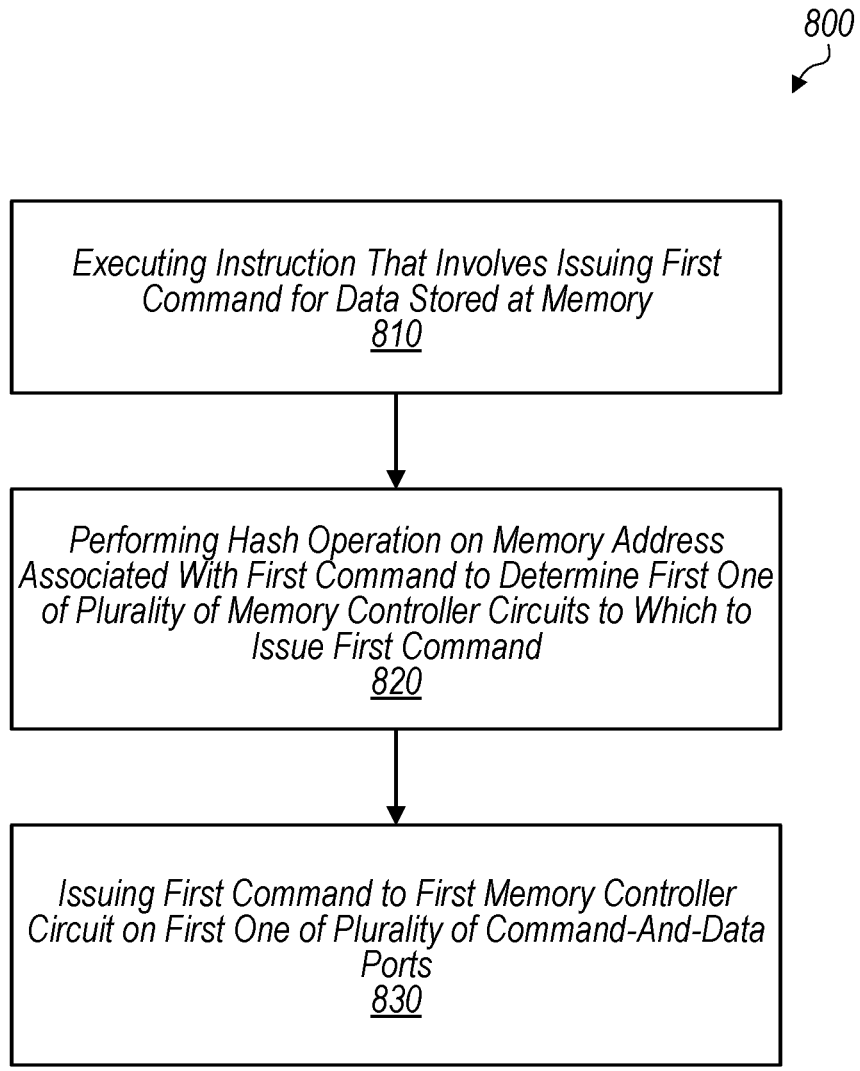

Turning now to FIG. 8, a flow diagram of a method 800 is shown. Method 800 is one embodiment of a method performed by an agent circuit (e.g., an agent circuit 140) of a system (e.g., a computing device having SOC 100) as part of issuing commands (e.g., commands 230). Method 800 may include more or less steps than shown. For example, method 800 may include a step in which the agent circuit receives a response to a command that was issued to another component.

Method 800 begins in step 810 with the agent circuit executing an instruction that involves issuing a first command for data that is stored at a memory (e.g., a memory 110). In various embodiments, the agent circuit includes a plurality of command-and-data ports (e.g., communication ports 145A and 145B) that couple the agent circuit to a communication fabric (e.g., communication fabric 130) that is coupled to a plurality of hardware components having a plurality of memory controller circuits that facilitate access to the memory. The agent circuit may be a processing complex (e.g., CPU, GPU, etc.) having a plurality of processor cores that are configured to collectively utilize the plurality of command-and-data ports.

In step 820, the agent circuit performs a hash operation on a memory address associated with the first command to determine a first one of the plurality of memory controller circuits (e.g., memory controller 120B) to which to issue the command. In step 830, the agent circuit issues the first command to the first memory controller circuit on a first one of the plurality of command-and-data ports. In various embodiments, the agent circuit is configured to issue all commands destined to the first memory controller circuit on the first command-and-data port. In some cases, a second agent circuit includes the data for which the first agent circuit issued the first command to the first memory controller circuit. Accordingly, the agent circuit may receive, from the second agent circuit, the data on a second one of the plurality of command-and-data ports.

In various embodiments, the agent circuit is able to saturate an available bandwidth of the communication fabric when concurrently issuing commands on all of the command-and-data ports but is not able to saturate the available bandwidth of the communication fabric when concurrently issuing commands on less than all of the command-and-data ports. The agent circuit may determine to issue a second command for data. Accordingly, the agent circuit may perform the hash operation on a memory address associated with the second command to determine a second one of the plurality of memory controller circuits to which to issue the second command. The agent circuit may issue the second command to the second memory controller circuit on a second one of the plurality of command-and-data ports. In various embodiments, the agent circuit is configured to issue all commands destined to the second memory controller circuit on the second command-and-data port.

Figure 9:
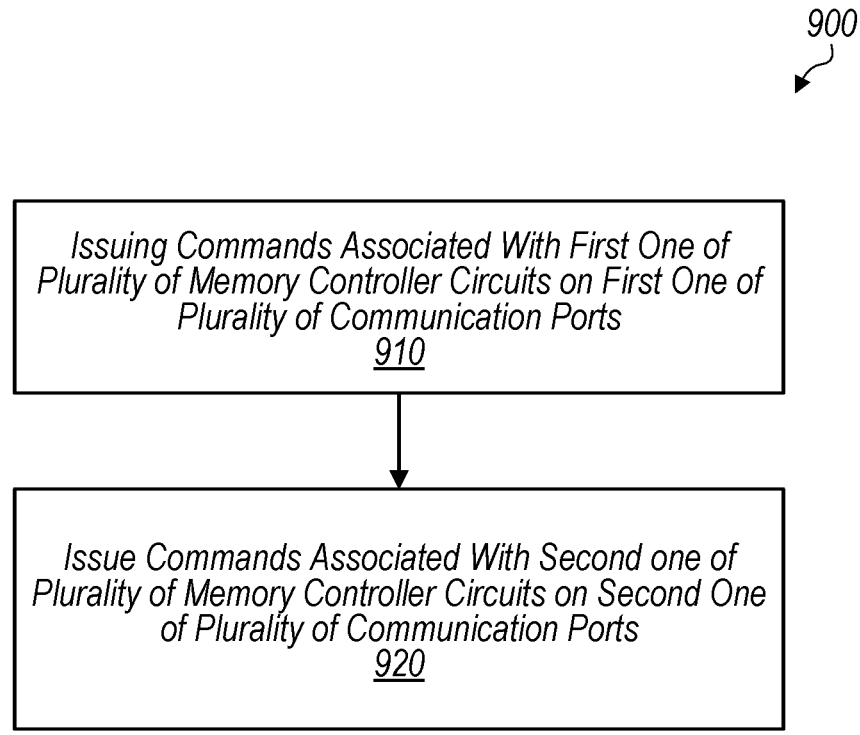

Turning now to FIG. 9, a flow diagram of a method 900 is shown. Method 900 is one embodiment of a method performed by an agent circuit (e.g., an agent circuit 140) of a system (e.g., a computing device having SOC 100) as part of issuing commands (e.g., commands 230). Method 900 may include more or less steps than shown. For example, method 900 may include a step in which the agent circuit receives a response to a command that was issued to another component.

Method 900 begins in step 910 with the agent circuit issuing commands associated with a first one of a plurality of memory controller circuits (e.g., memory controller 120A) on a first one of a plurality of communication ports (e.g., communication port 145A) of the agent circuit. In step 920, the agent circuit issues commands associated with a second one of the plurality of memory controller circuits (e.g., memory controller 120A) on a second one of the plurality of communication ports (e.g., communication port 145B). In some embodiments, the agent circuit hashes a memory address of a given command of a particular command type to determine which one of the plurality of memory controller circuits is associated with the given command. The agent circuit may issue non-dynamic random-access memory (non-DRAM) commands on the same communication port. The agent circuit may also utilize a mapping that specifies, for a given memory controller circuit or agent circuit, which one of the plurality of communication ports to utilize to issue commands to that given memory controller circuit or agent circuit.

Example Device

Figure 10:
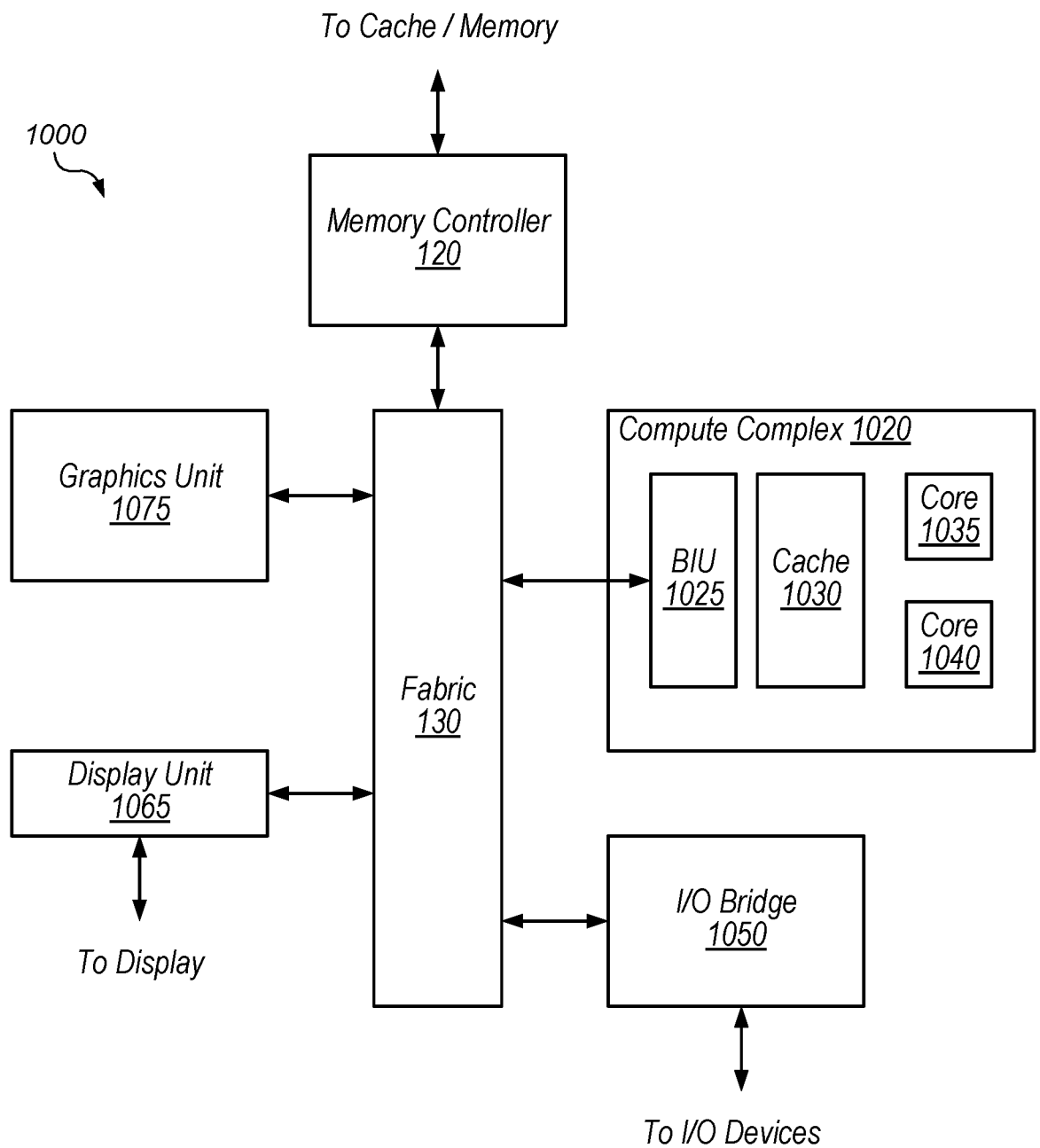
FIG. 10 is a block diagram illustrating elements of a device that implements components described in the present disclosure, according to some embodiments.

Referring now to FIG. 10, a block diagram illustrating an example embodiment of a device 1000 is shown. Device 1000 can implement functionality of agent circuits 140. In some embodiments, elements of device 1000 may be included within a system on a chip (e.g., SOC 100). In some embodiments, device 1000 may be included in a mobile device, which may be battery-powered. Therefore, power consumption by device 1000 may be an important design consideration. In the illustrated embodiment, device 1000 includes communication fabric 130, compute complex 1020 (corresponding to an agent circuit 140), input/output (I/O) bridge 1050, a memory controller 120, graphics unit 1075, and display unit 1065. In some embodiments, device 1000 includes other components (not shown) in addition to or in place of the illustrated components, such as video processor encoders and decoders, image processing or recognition elements, computer vision elements, etc.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in communication fabric 130, cache 1030, or elsewhere in device 1000 may be configured to maintain coherency between various caches of device 1000. BIU 1025 may be configured to manage communication between compute complex 1020 and other elements of device 1000. Processor cores, such as cores 1035 and 1040, may be configured to execute instructions of a particular instruction set architecture (ISA) which may include operating system instructions and user application instructions. These instructions may be stored in computer readable medium such as a memory (e.g., memory 110) that is coupled to memory controller 120.

As used herein, the term "coupled to" may indicate one or more connections between elements, and a coupling may include intervening elements. For example, in FIG. 10, graphics unit 1075 may be described as "coupled to" a memory through communication fabric 130 and memory controller 120. In contrast, in FIG. 10, graphics unit 1075 is "directly" coupled to fabric 130 because there are no intervening elements.

Graphics unit 1075 may include one or more processors, e.g., one or more graphics processing units (GPUs). Graphics unit 1075 may receive graphics-oriented instructions, such as OPENGL®, Metal®, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related). In various embodiments, graphics unit 1075 is an agent circuit 140.

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050.

In some embodiments, device 1000 includes network interface circuitry (not explicitly shown) that may be connected to communication fabric 130 or I/O bridge 1050. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1000 with connectivity to various types of other devices and networks.

Example Applications

Figure 11:
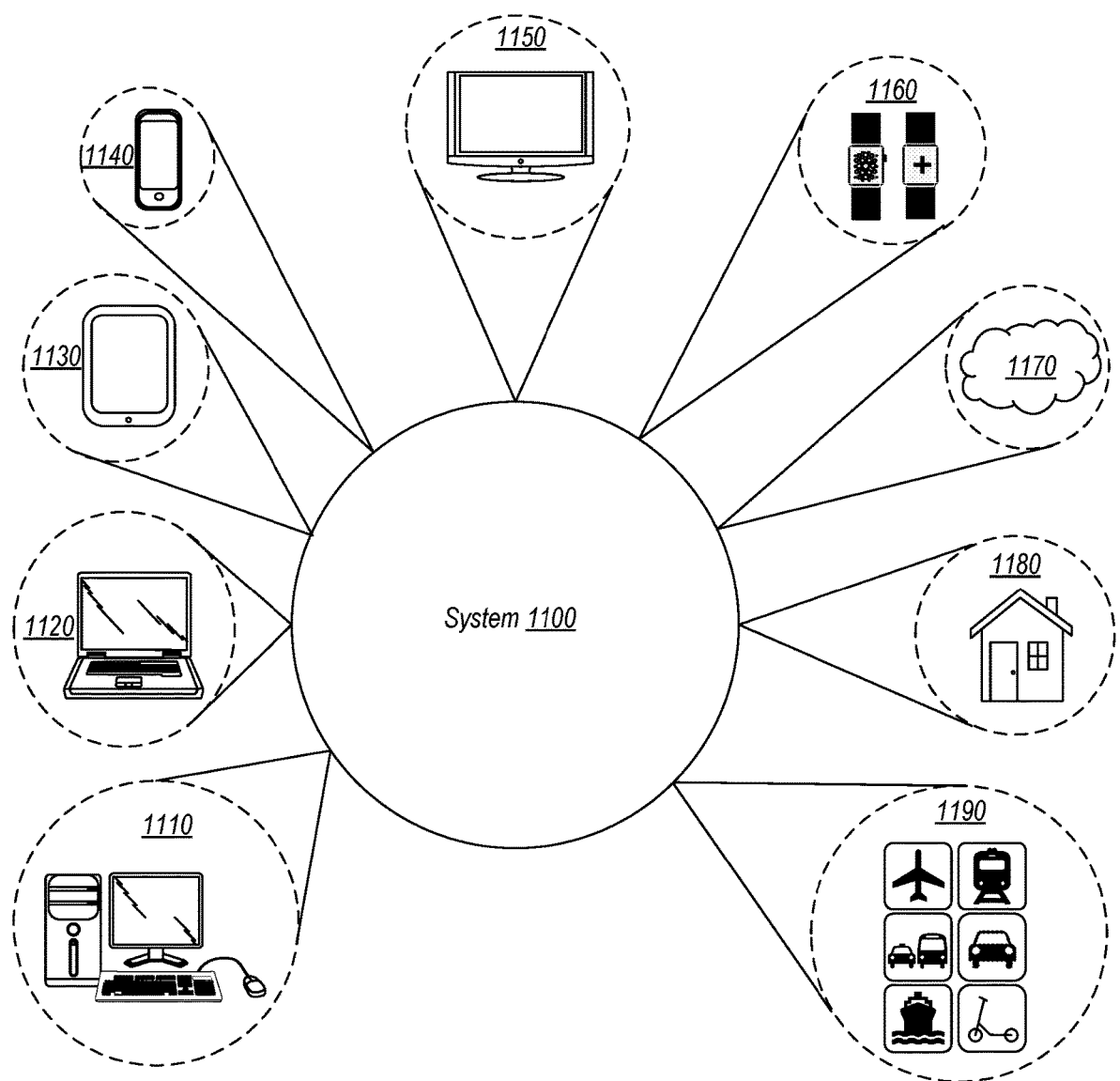
FIG. 11 is a block diagram illustrating an example of a system used in various types of applications, according to some embodiments.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
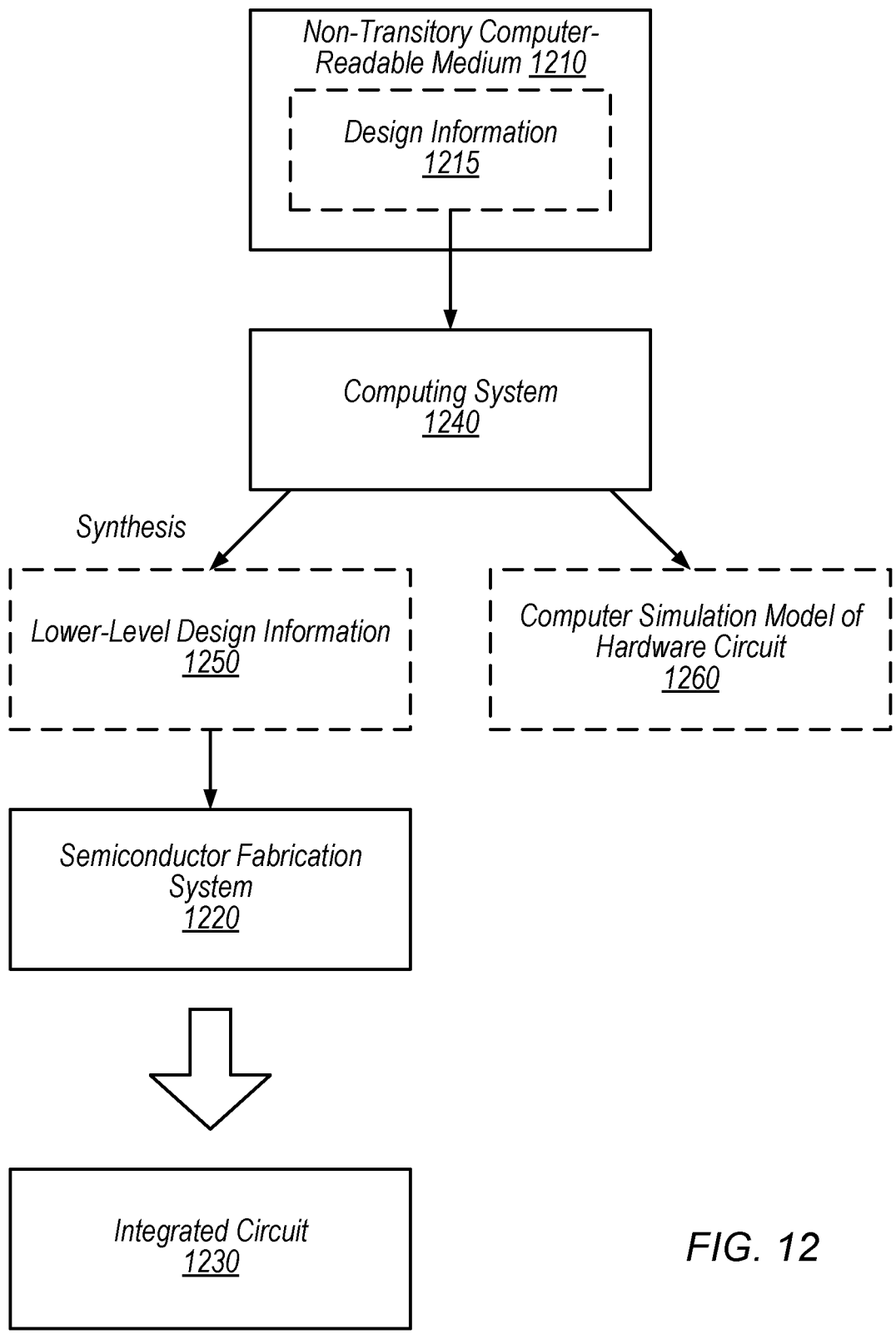
FIG. 12 is a block diagram illustrating an example process of fabricating an integrated circuit, according to some embodiments.

FIG. 12 is a block diagram illustrating an example non-transitory computer-readable storage medium that stores circuit design information, according to some embodiments. In the illustrated embodiment, computing system 1240 is configured to process the design information. This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate both a computer simulation model of a hardware circuit 1260 and lower-level design information 1250. In other embodiments, computing system 1240 may generate only one of these outputs, may generate other outputs based on the design information, or both. Regarding the computing simulation, computing system 1240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1240 also processes the design information to generate lower-level design information 1250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls (e.g., programs) the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Accordingly, non-transitory computer-readable storage medium 1210 may include two or more memory media; such media may reside in different locations—for example, in different computer systems that are connected over a network.

Design information 1215 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1240, semiconductor fabrication system 1220, or both. In some embodiments, design information may also include one or more cell libraries that specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of various elements shown in FIGS. 1-6. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
a plurality of hardware components that include a plurality of memory controller circuits and one or more agent circuits; and
a communication fabric coupled to ones of the plurality of hardware components and configured to route commands among the hardware components coupled to the communication fabric;
wherein the plurality of memory controller circuits are configured to couple to memory; and
wherein a first one of the one or more agent circuits comprises a plurality of communication ports that couple the first agent circuit to the communication fabric, wherein a given communication port of the plurality of communication ports is usable to issue commands to other components of the plurality of hardware components, and wherein the first agent circuit is configured to:
execute an instruction that involves issuing a command for data stored at the memory;
determine, based on a target address associated with the data, a first memory controller circuit of the plurality of memory controller circuits to which to issue the command; and
issue, on a particular one of the plurality of communication ports that is designated to the first memory controller circuit, the command to the first memory controller circuit.

2. The system of claim 1, wherein to determine the first memory controller circuit, the first agent circuit is configured to:
perform a hash operation on the target address to generate a hash value, wherein the hash value corresponds to the first memory controller circuit.

3. The system of claim 1, wherein the first agent circuit is configured to:
issue a command to a second agent circuit on a first one of the plurality of communication ports in accordance with a set of mappings that identify, for a given agent circuit, which one of the plurality of communication ports to use to issue commands to the given agent circuit.

4. The system of claim 3, wherein the first agent circuit is configured to receive a response from the second agent circuit on a second one of the plurality of communication ports that is different than the first communication port.

5. The system of claim 3, further comprising:
a plurality of integrated circuit dies that are coupled together, wherein the first and second agent circuits reside on different integrated circuit dies.

6. The system of claim 1, wherein the first agent circuit is configured to issue different types of commands on the plurality of communication ports, and wherein the different types include a particular type for which the first agent circuit is configured to issue all commands of that particular type on a same one of the plurality of communication ports.

7. The system of claim 1, wherein at least two of the plurality of communication ports are command-and-data ports configured to issue and receive commands and data.

8. The system of claim 1, wherein the communication fabric comprises:
a first communication path that is coupled to a first one of the plurality of communication ports and configured to route commands in a clockwise direction among the plurality of hardware components, and
a second communication path that is coupled to a second one of the plurality of communication ports and configured to route commands in a counterclockwise direction among the plurality of hardware components.

9. The system of claim 1, wherein the first agent circuit is configured to issue commands on at least two different ones of the plurality of communication ports within a same clock cycle.

10. The system of claim 1, wherein the first agent circuit is configured to issue commands to at least two different memory controller circuits on a same one of the plurality of communication ports.

11. The system of claim 1, wherein the communication fabric is configured to prevent an agent circuit from solely saturating the communication fabric when at least two agent circuits attempt to issue commands on the communication fabric.

12. A method, comprising:
executing, by a first agent circuit of a computer system, an instruction that involves issuing a first command for data stored at a memory, wherein the first agent circuit includes a plurality of command-and-data ports that couple the first agent circuit to a communication fabric that is coupled to a plurality of hardware components having a plurality of memory controller circuits that facilitate access to the memory;
performing, by the first agent circuit, a hash operation on a memory address associated with the first command to determine a first one of the plurality of memory controller circuits to which to issue the first command; and
issuing, by the first agent circuit, the first command to the first memory controller circuit on a first one of the plurality of command-and-data ports, wherein the first agent circuit is configured to issue all commands destined to the first memory controller circuit on the first command-and-data port.

13. The method of claim 12, wherein a second agent circuit includes the data for which the first agent circuit issued the first command to the first memory controller circuit, and wherein the method further comprises receiving, by the first agent circuit and from the second agent circuit, the data on a second one of the plurality of command-and-data ports.

14. The method of claim 12, further comprising:
  determining, by the first agent circuit, to issue a second command for data;
  performing, by the first agent circuit, the hash operation on a memory address associated with the second command to determine a second one of the plurality of memory controller circuits to which to issue the second command; and
  issuing, by the first agent circuit, the second command to the second memory controller circuit on a second one of the plurality of command-and-data ports, wherein the first agent circuit is configured to issue all commands destined to the second memory controller circuit on the second command-and-data port.

15. The method of claim 12, wherein the first agent circuit is able to saturate an available bandwidth of the communication fabric when concurrently issuing commands on all of the plurality of command-and-data ports but is not able to saturate the available bandwidth of the communication fabric when concurrently issuing commands on less than all of the plurality of command-and-data ports.

16. The method of claim 12, wherein the first agent circuit is a processing complex having a plurality of processor cores configured to collectively utilize the plurality of command-and-data ports.

17. A non-transitory computer-readable medium having stored thereon design information specifying a circuit design in a format that is recognizable by a fabrication system that is configured to use the design information to fabricate a hardware integrated circuit that comprises:
  a plurality of hardware components that include a plurality of memory controller circuits and one or more agent circuits; and
  a communication fabric coupled to ones of the plurality of hardware components and configured to route commands among the hardware components coupled to the communication fabric;
  wherein the plurality of memory controller circuits are configured to couple to memory; and
  wherein a particular one of the one or more agent circuits comprises a plurality of communication ports that couple the particular agent circuit to the communication fabric, wherein a given communication port of the plurality of communication ports is usable to issue commands to other components of the plurality of hardware components, and wherein the particular agent circuit is configured to:
    issue commands associated with a first one of the plurality of memory controller circuits on a first one of the plurality of communication ports; and
    issue commands associated with a second one of the plurality of memory controller circuits on a second one of the plurality of communication ports.

18. The non-transitory computer-readable medium of claim 17, wherein the particular agent circuit is configured to hash a memory address of a given command of a particular command type to determine which one of the plurality of memory controller circuits is associated with the given command.

19. The non-transitory computer-readable medium of claim 17, wherein the particular agent circuit is configured to issue non-dynamic random-access memory (non-DRAM) commands on a same one of the plurality of communication ports.

20. The non-transitory computer-readable medium of claim 17, wherein the particular agent circuit includes a mapping that specifies, for a given memory controller circuit or agent circuit, which one of the plurality of communication ports to utilize to issue commands to that given memory controller circuit or agent circuit.

* * * * *